(12) United States Patent
Selfridge et al.

(10) Patent No.: US 6,264,374 B1
(45) Date of Patent: Jul. 24, 2001

(54) ARRANGEMENT FOR INTEGRATING A RECTANGULAR FIBER OPTIC CONNECTOR INTO A CYLINDRICAL CONNECTOR

(75) Inventors: Ritch Allen Selfridge, Sidney; Robert Kenneth Chapman, West Winfield, both of NY (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 09/149,568

(22) Filed: Sep. 9, 1998

(51) Int. Cl.⁷ ........................................................ G02B 6/36
(52) U.S. Cl. ........................ 385/78; 385/60; 385/62; 385/81; 385/87
(58) Field of Search ................................. 385/78, 75–77, 385/81, 87, 53–55, 60, 58, 59, 62

(56) References Cited

U.S. PATENT DOCUMENTS

| | | | |
|---|---|---|---|
| 4,140,367 | 2/1979 | Makuch et al. | 385/59 |
| 4,142,776 | 3/1979 | Cherin et al. | 385/83 |
| 4,174,882 | 11/1979 | McCartney | 385/53 |
| 4,272,154 | 6/1981 | Bachel | 385/65 |
| 4,746,310 | 5/1988 | Morse et al. | 439/620 |
| 5,000,536 | 3/1991 | Anderson et al. | 385/53 |
| 5,104,242 | 4/1992 | Ishikawa | 385/53 |
| 5,211,582 | 5/1993 | Morse et al. | 439/589 |
| 5,231,685 * | 7/1993 | Hanzawa et al. | 385/84 |
| 5,283,848 | 2/1994 | Abendschein et al. | 385/59 |
| 5,519,799 * | 5/1996 | Murakami et al. | 385/78 |
| 5,553,157 | 9/1996 | Bourguignon et al. | 382/131 |
| 5,619,604 | 4/1997 | Shiflett et al. | 385/59 |
| 5,689,598 | 11/1997 | Dean, Jr. et al. | 385/59 |
| 5,715,342 | 2/1998 | Nodfelt et al. | 385/61 |
| 5,717,800 * | 2/1998 | Funabashi | 385/49 |
| 5,832,162 * | 11/1998 | Sarbell | 385/99 |
| 5,920,669 * | 7/1999 | Knecht et al. | 385/76 |

FOREIGN PATENT DOCUMENTS 0 253 426 A1   1/1998   (EP) .

* cited by examiner

Primary Examiner—Rodney Bovernick
Assistant Examiner—Ellen E. Kim
(74) Attorney, Agent, or Firm—Blank Rome Comisky & McCauley, LLP (57) ABSTRACT

A fiber optic connector system is made up of a socket contact and a pin contact arranged to be installed in a cylindrical multiple contact connector, each contact including a fiber optic connector that has been terminated to a ribbon cable and captured between two halves of a cylindrical contact body, the socket contact being spring loaded to provide an engagement force between the two contacts when assembled into a housing. The pin and socket contacts may be installed in a wide variety of connector housings configured to receive cylindrical contacts, including the MIL-C-38999 family of connector shells, utilizing existing coupling and mounting arrangements, with the optional addition in the plug connector of a torsion spring biased shutter arranged to shield the ends of the fibers before coupling, and which is moved by a cam surface in the receptacle connector of the fiber optic connector system to uncover the ends of the fibers during coupling.

21 Claims, 6 Drawing Sheets

ARRANGEMENT FOR INTEGRATING A RECTANGULAR FIBER OPTIC CONNECTOR INTO A CYLINDRICAL CONNECTOR

BACKGROUND OF THE INVENTION

1. Field of the Invention

This invention relates to fiber optic connectors, and in particular to an arrangement for integrating a rectangular fiber optic connector into a cylindrical connector.

2. Description of Related Art

The fiber optic connector commonly known as the Mechanical Transfer (MT) connector, but more accurately described as an MT ferrule, is essentially a housing that encapsulates the ends of a plurality of fibers and thus aids in aligning the fibers so that the ends of the fibers can be mechanically joined together to establish a connection between two groups of fibers in a manner analogous to the connection made by an electrical connector. Use of MT connectors facilitates coupling of the fibers because it is only necessary to align the MT connectors in order to align the fibers, rather than having to align individual fibers.

Conventionally, MT connectors or ferrules are pre-formed around the ends of fibers extending from a fiber optic ribbon cable, and thus are most conveniently formed into a parallelepiped shape, referred to herein as a "rectangular" shape. In order to utilize the MT connectors, they are integrated into a rectangular housing that provides coupling and alignment functions.

Even though rectangular fiber optic coupler arrangements are becoming quite common, and follow naturally from the shape of the MT ferrules, there are many situations where cylindrical couplers may be preferred for ease-of-handling and mounting. In military applications especially, cylindrical electrical connector standards have been the norm for many years and in upgrading from electrical to fiber optic cabling it would be highly advantageous if the standards did not have to be re-written in all situations to cover rectangular configurations, enabling existing hardware and environmental sealing arrangements to continue to be utilized.

As a result, it has previously been proposed to integrate rectangular fiber optic connectors into cylindrical connector housings. However, such integration has previously required specially designed connector housings arranged to collectively accommodate multiple rectangular fiber optic connectors, examples of which are described in U.S. Pat. Nos. 4,142,776 and 5,689,598. Other references showing cylindrical fiber optic connector configurations include U.S. Pat. Nos. 5,715,342, 5,283,848, 5,000,536, 4,174,882, and 4,140,367. In contrast, the present invention encloses the rectangular fiber optic connectors or ferrules in individual shells, which can then be inserted in a generally standard cylindrical connector housing or shell.

In addition to references showing rectangular fiber optic connectors integrated into cylindrical connector shells, the related art for the present invention includes a reference, U.S. Pat. No. 5,619,604, showing enclosure of individual rectangular fiber optic connectors in a rectangular connector shell. The present invention also uses the principle of enclosing individual fiber optic connectors in individual connector shells, but does so in a way that enables their use in cylindrical connectors, avoiding the complexities and lack of uniform standards suffered by prior cylindrical fiber optic connector configurations.

Also of interest as background for the present invention are refer U.S. Pat. Nos. 5,553,157 and 5,104,242 which show shutter arrangements for fiber optic connectors. One of the features of the present invention is a shutter mechanism that, unlike those of U.S. Pat. Nos. 5,553,157 and 5,104,242, is a torsion-spring based rotary shutter mechanism adapted for use in a cylindrical multiple contact connector shell or housing.

While the invention generally covers an arrangement for utilizing rectangular MT connectors in cylindrical connectors, and is not to be limited to a particular cylindrical connector configuration, an example of a cylindrical connector configuration currently used for electrical connectors, but which could be adapted using the principles of the invention to couple fiber optic cables, is the cylindrical connector known as the MIL-C-38999 Series III connector (the identification number of the connector referring to a U.S. Department of Defense connector specification), which is similar to the connectors illustrated in U.S. Pat. Nos. 4,746,310 and 5,211,582, in its use of removable cylindrical contacts (referred to as size 8 contacts) held in place within the connector by an insert assembly having a plurality of bores for individual contacts, the contacts being held in place by engagement between shoulders on the contacts and tines extending inwardly from the bores that flex to permit the contacts to be snapped into place, and that permit the contacts to be removed by a tool arranged to be inserted into the bores in order to disengage the tines from the shoulders.

In designing connectors to meet military specifications, robustness, standardization, and ease-of-use, installation, and servicing under difficult conditions are all of critical importance, and it is the objective of the invention to meet these goals by adapting the conventional MT connector or ferrule for use in military style cylindrical multiple contact connectors. It should nevertheless be appreciated that the goals of the military are also relevant to civilian applications such as avionics, and that the invention is not limited to "Mil Spec" connectors, or to any particular cylindrical connector configuration.

SUMMARY OF THE INVENTION

It is accordingly a first objective of the invention to provide a relatively low cost, high density, high performance fiber optic connector system suitable for use in a wide variety of applications, utilizing standardized parts including standard rectangular fiber optic connectors or ferrules, including but not limited to "MT" ribbon cable connectors or ferrules, and adapting them to a cylindrical configuration.

It is a second objective of the invention to provide an arrangement that allows a fiber optic connector to be adapted to a wide variety of different connector configurations, using many of the same components.

It is a third objective of the invention to provide a simplified mounting arrangement for an MT connector, and in particular to provide an arrangement for adapting an MT connector to a size 8 or similar contact configuration, which can then easily be adapted to many different configurations of cylindrical connectors, using many of the same components.

These objectives are achieved, in accordance with the broadest principles of the invention, by arranging a rectangular fiber optic connector or ferrule in a shell having dimensions of a standard cylindrical contact body for insertion into a connector housing capable of receiving such a standard cylindrical contact body.

These objectives are further achieved, in accordance with the principles of a preferred embodiment of the invention, by providing a fiber optic connector system made up of a socket contact and a pin contact arranged to be installed in a cylindrical multiple contact connector, each contact including a fiber optic connector that has been terminated to a ribbon cable and captured between two halves of a cylindrical contact body, the socket contact being spring loaded to provide an engagement force between the two contacts when assembled into a housing.

The pin and socket contacts of the preferred embodiment of the invention may be installed in a wide variety of connector housings configured to receive cylindrical contacts, including but not limited to the above-mentioned MIL-C-38999 family of connectors, utilizing existing coupling and mounting arrangements with minimal adaptation to meet the requirements of fiber optic connections, allowing multiple fiber optic ribbon cables to be coupled in a single operation.

In an especially preferred embodiment of the invention, however, the pin and socket contacts of the preferred embodiment are included in a multiple contact cylindrical connector having a shutter arranged to shield the ends of the fibers before coupling, and which automatically uncovers the ends of the fibers during coupling of one cylindrical connector to another.

DETAILED DESCRIPTION OF THE PREFERRED EMBODIMENTS

Figure 1:
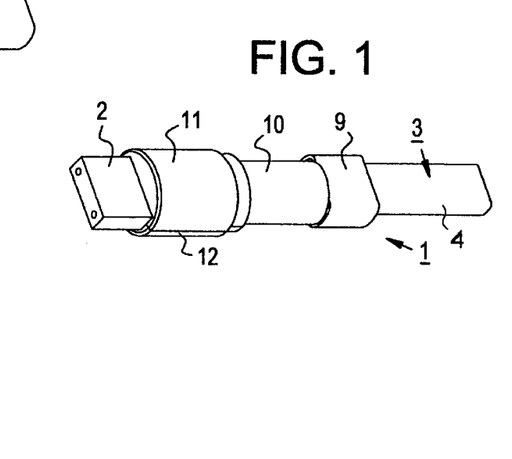
FIG. 1 is an isometric view of an assembled pin contact constructed in accordance with the principles of a preferred embodiment of the invention.
Figure 2:
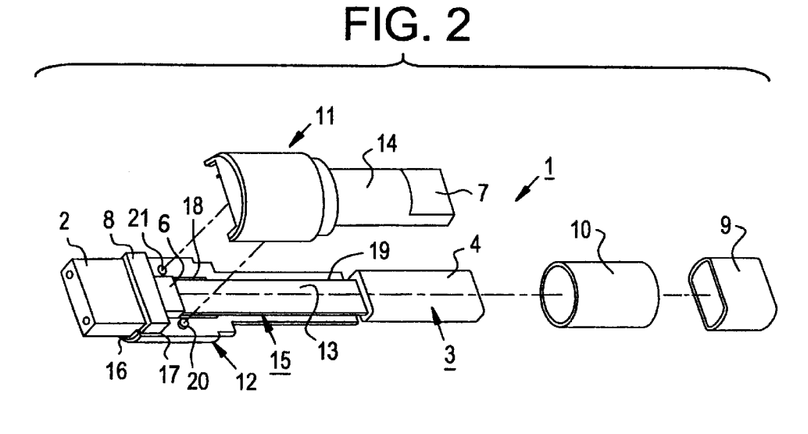
FIG. 2 is an exploded isometric view showing the various parts of a pin contact corresponding to the pin contact illustrated in FIG. 1.
Figure 3:
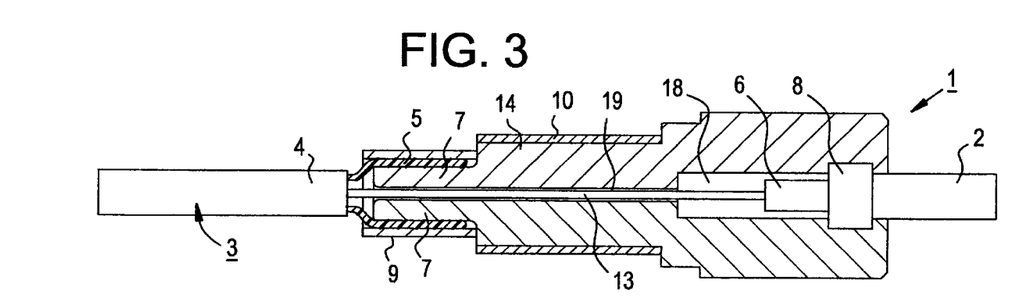
FIG. 3 is a cross-sectional side view of the assembled pin contact illustrated in FIG. 2.

FIGS. 1–3 illustrate a fiber optic pin contact 1 constructed in accordance with the principles of a preferred embodiment of the invention. The pin contact 1 of the preferred embodiment includes a fiber optic ferrule 2 and a ribbon cable 3 that has been terminated to the ferrule 2, and that includes multiple optical fibers (not shown) enclosed within a jacket 4, the jacket conventionally surrounding both the fibers and a strength member (a section 5 of which is shown in FIG. 3). In the preferred embodiment, the strength member and jacket are stripped back from the ferrule 2 to a specific dimension, the jacket 4 being stripped to a further specific dimension, leaving exposed section 5 of the strength member that is slit so that it can be fitted over a crimp ferrule 7 at the rear of the assembled contact body, as will be described below.

Ferrule 2 is illustrated as an MT connector of the type having a pin block 8 and strain relief 6 extending from the rear of the ferrule. The ferrule and ribbon cable are both standard and form no part of the present invention, although those skilled in the art will appreciate that the invention is in principle applicable to any parallelepiped-shaped or "rectangular" fiber optic connector, connector block, or ferrule arranged to provide a reference for aligning the ends of one or more optical fibers so that they can be coupled to other optical fibers housing in similar connectors, connector blocks, or ferrules.

The fiber optic pin contact is constructed of the ferrule 2 to which ribbon cable 3 has been pre-terminated, a crimp sleeve 9, a contact retention collar 10, and pin contact halves 11 and 12. The exterior configuration of pin contacts halves 11 and 12 is such that, when the pin contact halves are assembled together with the ferrule 2 and ribbon cable 3 captured therebetween, the resulting pin contact can be fitted into a connector housing or insert arranged to accommodate standard pin contacts. Numerous standard pin contact configurations exist, and the invention is not intended to be limited to any particular pin contact configuration, but the illustrated pin contact configuration is similar to a standard size 8 pin contact of the type use in MIL-C-38999 type high density multiple contact connectors.

Pin contact halves 11 and 12 are assembled as shown in FIG. 2 to the ferrule 2 and portion 13 of the cable that has been stripped of both the jacket and strength member. The contact retention collar 10, which has been slid over the ribbon cable before assembly of the contact halves to each other, is then fitted over a cylindrical intermediate portion 14 of the assembled contact halves to secure the contact halves together. In the illustrated embodiment, contact retention collar 10 is a heat shrink sleeve, although those skilled in the art will appreciate that the contact halves may be held together by any known mechanical securing means.

The pin contact assembly 1 is completed by sliding a crimp sleeve 9, which has also been fitted over the ribbon cable before assembly of the pin contact halves, over the crimp ferrule 7 extending rearwardly from the assembled pin contact body, and crimping the exposed section 5 of the strength member to crimp ferrule 7.

As is evident from FIG. 2, each of the pin contact halves includes a passage 15 made up of section 16 through which the mating portion of the ferrule extends, an enlarged section 17 dimensioned so as to capture pin block 8 of the fiber optic ferrule 2, a further section 18 extending rearwardly of section 17 for accommodating strain relief 6, and a still further section 19 extending rearwardly from the groove 18 for accommodating the stripped portion 13 of the fiber optic ribbon cable. Each of the pin contact halves also includes a pin 20 and an opening 21 for facilitating alignment of the halves upon assembly to each other with the ferrule 2 and ribbon cable 3 captured therebetween.

Figure 4:
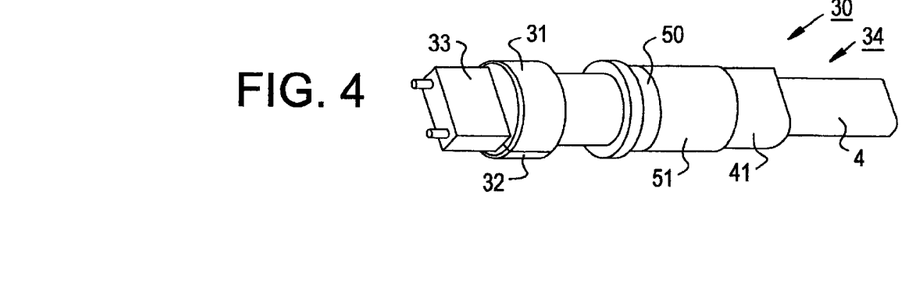
FIG. 4 is an isometric view showing a fiber optic socket contact constructed in accordance with the principles of a preferred embodiment of the invention.
Figure 5:
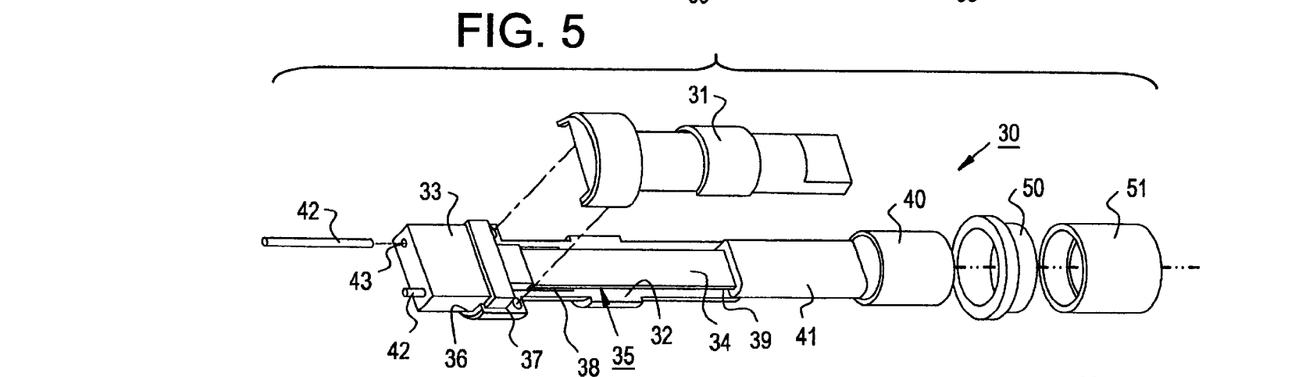
FIG. 5 is exploded isometric view showing the various parts of a fiber optic socket contact corresponding to the pin contact illustrated in FIG. 4.
Figure 6:
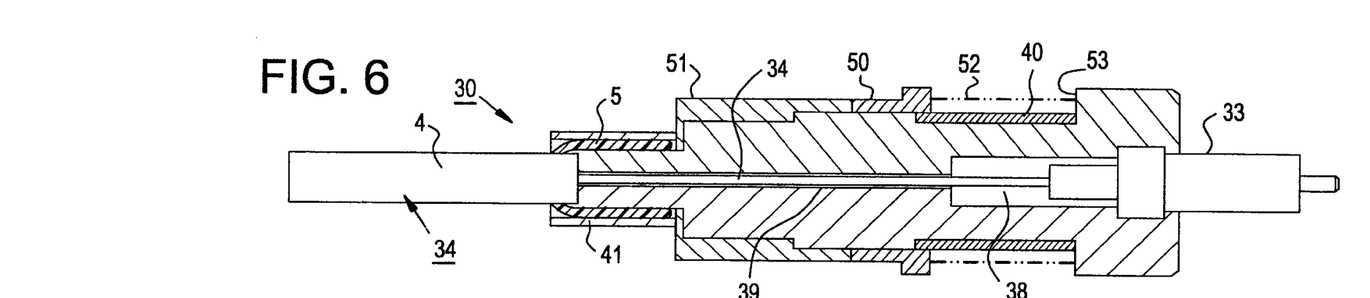
FIG. 6 is a cross-sectional side view of the assembled socket contact of FIG. 5.

As illustrated in FIGS. 4–6, socket contact 30 is similar to pin contact 1 in that it includes contact halves 31 and 32 arranged to capture a fiber optic ferrule 33 and ribbon cable 34 within a passage 35 made up of sections 36–39. Also as in the pin contact illustrated in FIGS. 1–3, the socket contact halves 31 and 32 may be held together by a contact retention collar 40 and a crimp sleeve 41, which are respectively slid over the ribbon cable before assembly of the contact halves to each other, and the outside configuration of the socket contact is such that the socket contact can be fitted into a cylindrical multiple contact connector shell or housing using a standard insert arrangement. Ferrule 33 and ribbon cable 34 are, in the illustrated embodiment, identical to ferrule 2 and ribbon cable 3, although ferrule 33 is illustrated as including alignment pins 42 inserted into openings 43.

In addition to the above elements, socket contact 30 includes a rear collar 50 and a retention collar 51 that are fitted over respective intermediate portions of the assembled socket contact. Retention collar 50 is biased in a rearward direction against the rear collar 51 by a coil spring 52 surrounding the first intermediate portion of the assembled contact halves so that it abuts a shoulder 53 at the rear of the front mating portion 54 of the assembled contact. This allows the mating interface of ferrule 33 to be biased against the corresponding mating interface of ferrule 2 in order to ensure a good coupling between the optical fibers in the respective connectors upon mating. Those skilled in the art will recognize that such biasing arrangements are well known in the art, and that other suitable biasing arrangements may be substituted for the illustrated one so long as they do not interfere with installation of the pin and socket contacts in a cylindrical connector shell or housing. An example of a cylindrical connector in which the pin and socket contacts of the invention may be used is described below, although the invention is not limited to any particular type of cylindrical connector.

The connector illustrated in FIGS. 7–14 is a standard MIL-C-38999 series III connector made up of a plug 60 and receptacle 80 configured in conventional manner, except that the electrical contacts are replaced by fiber optic contacts 1 and 2 secured by retention tines 62, and the plug includes a shutter mechanism 63.

Figure 7:
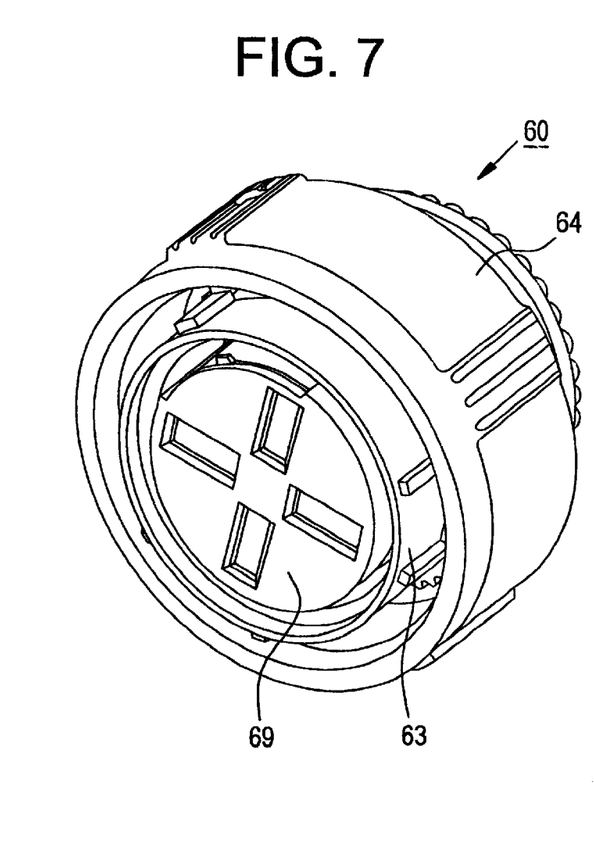
FIG. 7 is an isometric view of a plug connector constructed in accordance with the principles of a further preferred embodiment of the invention.
Figure 9:
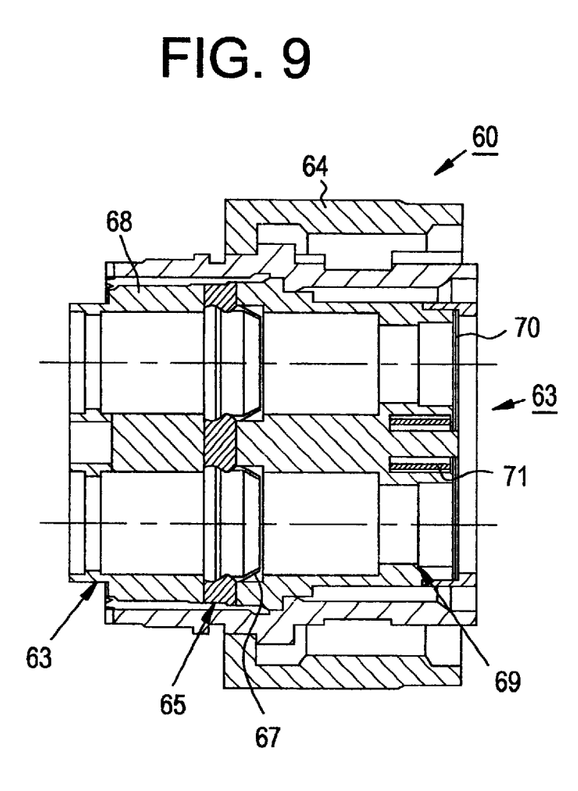
FIGS. 9 and 10 are cross-sectional side views of the plug and socket connectors illustrated in FIGS. 7 and 8.
Figure 14:
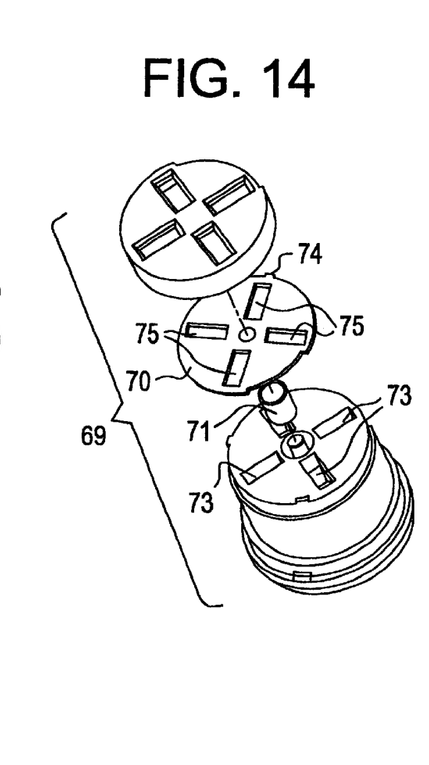
FIG. 14 is an exploded isometric view of the shutter arrangement included in the plug insert assembly of FIG. 13.

Plug 60 includes a standard cylindrical connector shell 63, coupling nut 64, insert 65 having cylindrical bores 66 from which retention tines 67 extend, and a standard sealing grommet 68. Also included is a front insert 69 which differs from the conventional front insert in that it is preferably arranged to accommodate a protective shutter 70 which is part of shutter mechanism 63. As illustrated in FIG. 1, protective shutter 70 is normally biased by a torsion spring 71 into a closed position, in which the shutter is rotated against stop 72, and in which openings 73 in insert 69 are covered by the shutter, so as to protect the person handling the plug from exposure to laser light transmitted by the fiber optics. When the plug connector is inserted into a corresponding socket connector, a cam surface on the socket connector engages a projection 74 on the shutter, as will be described below, to move the shutter into a position in which openings 75 in the shutter are aligned with openings 73 in the insert to permit passage of the mating ferrules. Although socket connectors are normally fixed in a panel or device, presenting less of a danger to the operator, those skilled in the art will appreciate that a corresponding shutter mechanism could also be included in the socket connector, or that the shutter mechanism could be omitted entirely. In addition, although four openings are illustrated, corresponding to four contacts, those skilled in the art will appreciate that the number of contacts and openings may be varied as space permits, including providing common openings for multiple contacts.

Figure 8:
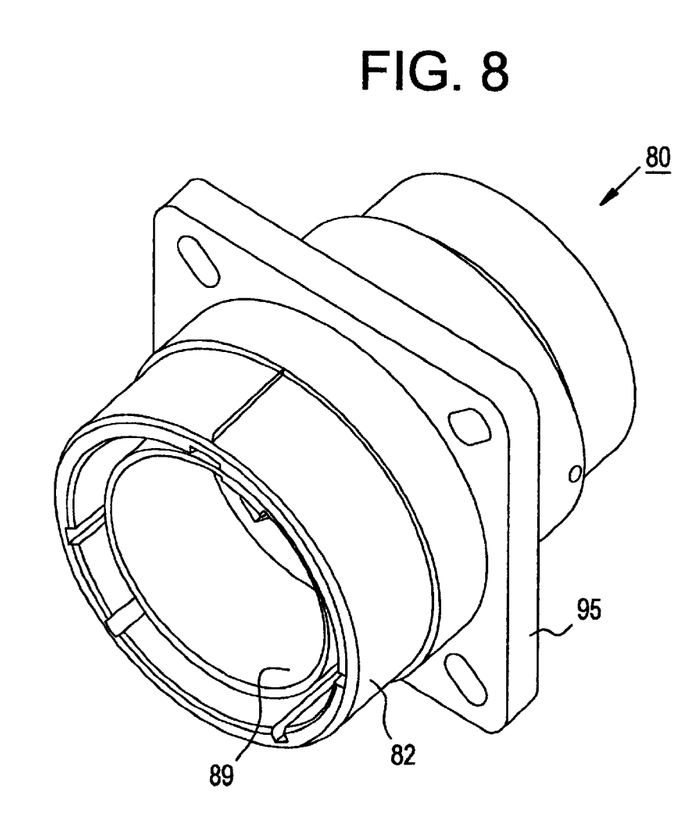
FIG. 8 is an isometric view of a preferred socket connector corresponding to the plug connector of FIG. 6.
Figure 10:
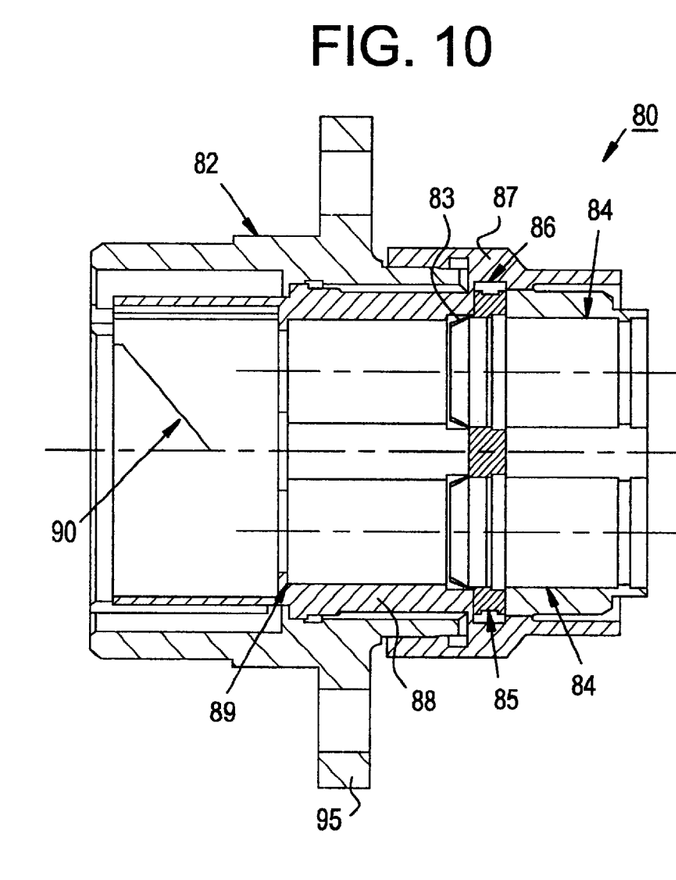

Receptacle 80, like plug 60, is configured in generally the same manner as the corresponding electrical connector receptacle, including a standard connector shell 82, standard contact retention tines 83 extending from passages 84 in an insert 85 held within an epoxy filled undercut 86 in a rear shell adapter 87, a standard rear grommet 88, and a front insert 89 adapted to activate the shutter 70 as described above, by engagement between cam surface 90 and projection 74 when the plug 60 is mated to the receptacle 80.

Figure 11:
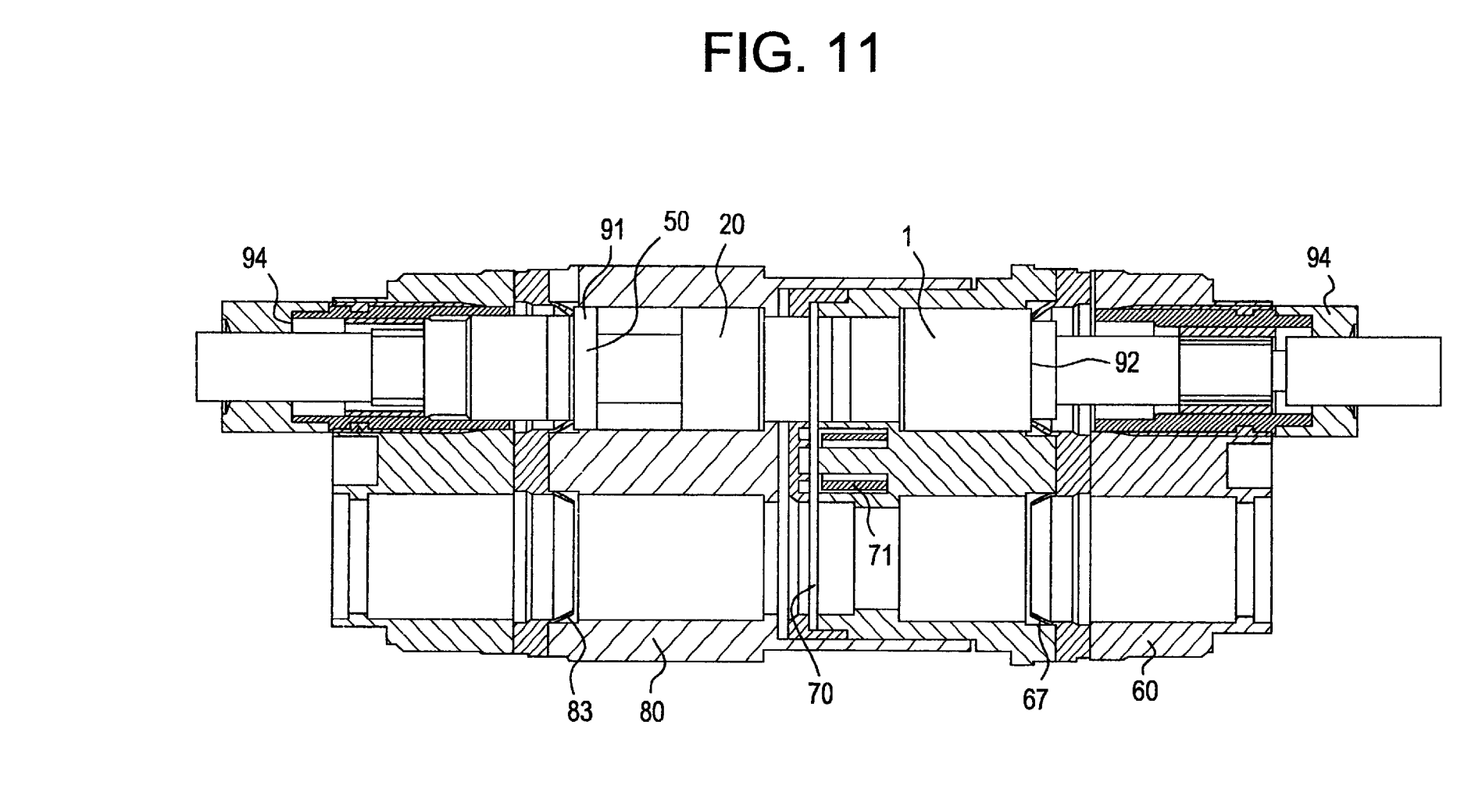
FIG. 11 is a cross-sectional side view showing the plug and socket connectors of FIGS. 7–10 and the pin and socket contacts of FIGS. 1–6 in mated position.
Figure 12:
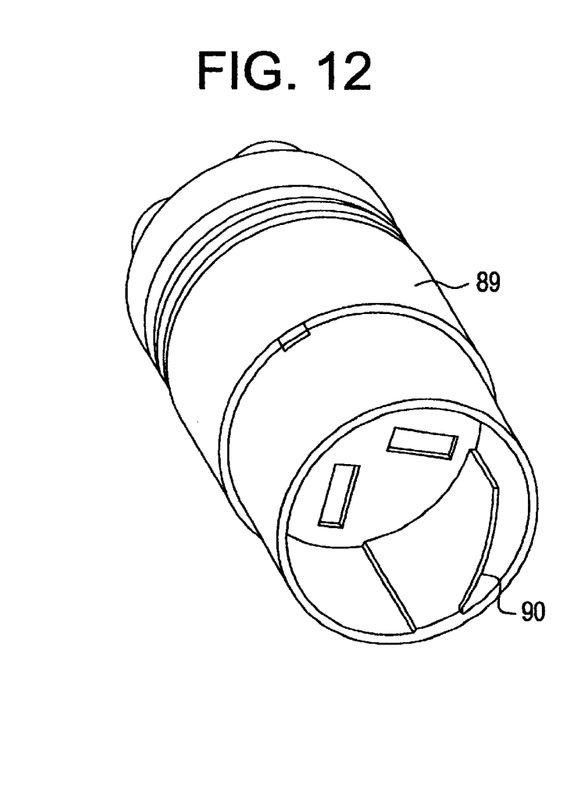
FIGS. 12 and 13 are respective isometric views of a plug insert assembly and a socket insert assembly for use in the plug and socket connectors of FIGS. 7–10.
Figure 13:
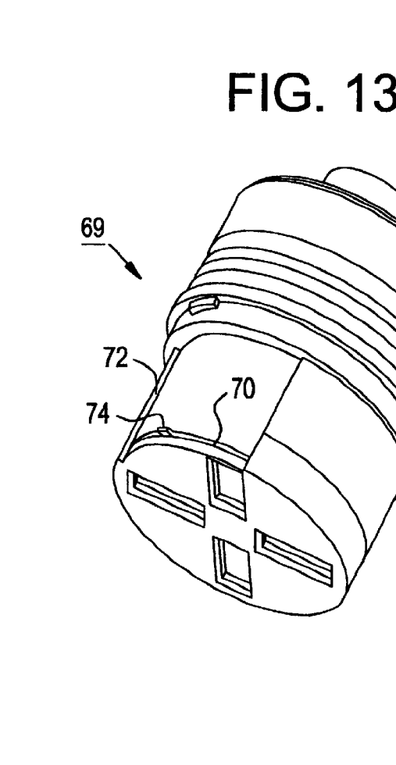

The cylindrical contact assemblies 1 and 20 are inserted from the rear in both the plug 60 and receptacle 80, such that respective shoulders 91 and 92 on the respective contacts move past the respective retention tines 62 and 83 and snap into place to prevent removal of the contacts in a rearward direction. In the case of the socket contacts, shoulder 92 is part of retention collar 50, and thus tines 83 of the receptacle serve not only to retain the contacts within the connector against withdrawal, but also to fix the position of the collar so that the socket contact is pushed rearwardly relative to the receptacle upon mating of the plug and receptacle, and thus exerts pressure on the interface between ferrules 2 and 33 in order to ensure proper engagement and ensure efficient coupling of a light between the connectors.

Those skilled in the art will appreciate that the spring tine retention system illustrated in particular in FIGS. 7–9 is the same system that is used by the crimp-removable electrical contacts in the current design of the MIL-C-38999 family of connectors. The reason why the receptacle connector has been laid out to house the socket contact and the plug connector to house the pin contact is that, typically, receptacle connectors are mounted to boxes, and there is some room within the box for the displacement of the fiber optic ribbon to be absorbed without damage. Plug connectors are typically assembled to cable assemblies, and the cables are typically confined to a protective sheath, leaving little room for absorption of displacement, and since the pin contact is not spring loaded, there is no displacement to absorb. If, on the other hand, different conditions apply to usage of the plug and receptacle connectors, the pin contacts included in the plug connectors could be biased in place of the socket contacts, or both the plug and socket contacts could be biased.

As in the electrical analogues to the illustrated connector, the cylindrical contact assemblies are removable from both connectors using a removal tool (not shown), that moves the spring tines away from the contacts so that the contact can be withdrawn from the connector, resulting in a multiple contact fiber optic connector that not only has the advantage of fitted the standard cylindrical connector footprint, but also of enabling removal of individual pin or socket contacts, using the same tools that are used to remove electrical contacts.

Optionally, MT-C-38999 piggyback seals 94 may be included at the rear of both the plug and receptacle connectors so as to seal the cable entry openings of the connectors. Additional seals or protective members may also be included at the front of the connector, and anywhere else in the connector that such seals are normally used. In addition, the exterior of the connector shell may include any features permitted by the standards including, as shown in FIG. 8, flanges 95.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. A cylindrical contact for a fiber optic connector, comprising:
   a ferrule having a parallelepiped shaped, said ferrule having positioned therein the end of at least one optical fiber;
   a contact housing including two contact housing members arranged to capture therebetween said ferrule and a portion of a fiber optic cable including said fiber and extending from said ferrule, said contact housing having a crimp ferrule portion and a generally cylindrical shape adapted to replace a contact of a cylindrical shaped electrical connector; and
   a crimp sleeve arranged to crimp a strength member of said fiber optic cable to the crimp ferrule portion of the contact housing.

2. A contact as claimed in claim 1, wherein said contact further includes a sleeve member arranged to secure said two contact housing members to each other.

3. A contact as claimed in claim 2, wherein said sleeve member is a heat shrink sleeve.

4. A contact as claimed in claim 1, wherein said cable is a fiber optic ribbon cable.

5. A contact as claimed in claim 1, wherein said ferrule is an MT ferrule.

6. A contact as claimed in claim 1, wherein said housing is a pin contact housing.

7. A contact as claimed in claim 1, wherein said housing is a socket contact housing.

8. A cylindrical fiber optic connector system comprising a cylindrical connector shell in which are positioned a plurality of contacts, each contact including a ferrule having a parallelepiped shape, said ferrule having positioned therein the end of at least one optical fiber, a contact housing having a generally cylindrical shape and a crimp ferrule portion and a crimp sleeve arranged to crimp a strength member of said fiber optic cable to the crimp ferrule portion of the contact housing.

9. A cylindrical connector system as claimed in claim 8, wherein said contact housing includes two contact housing members arranged to capture therebetween said ferrule and a portion of a fiber optic cable including said fiber and extending from said ferrule.

10. A connector system as claimed in claim 8, wherein said connector shell houses an insert including a plurality of passages for said contacts, said contacts being retained in said connector shell by tines extending into said passages and engageable with collars on said contacts to prevent removal of said contacts until said tines are caused to disengage from said contacts by a contact removal tool.

11. A connector system as claimed in claim 8, further comprising a shutter mechanism for shielding said contacts before mating of said cylindrical connector shell.

12. A connector system as claimed in claim 11, wherein said shutter mechanism includes a rotatable shutter biased into a closed position by a torsion spring.

13. A connector system as claimed in claim 12, wherein said shutter is moved into an open position by a cam on a mating connector shell.

14. A connector system as claimed in claim 8, wherein said contact further includes a sleeve member arranged to secure said two contact housing members to each other.

15. A connector system as claimed in claim 14, wherein said sleeve member is a heat shrink sleeve.

16. A connector system as claimed in claim 8, wherein said cable is a fiber optic ribbon cable.

17. A connector system as claimed in claim 8, wherein said ferrule is an MT ferrule.

18. A connector system as claimed in claim 8, wherein said contact housing is a pin contact housing.

19. A connector system as claimed in claim 8, wherein said contact housing is a socket contact housing.

20. A connector system as claimed in claim 19, further comprising a fixed collar and an annular member arranged to slide on said contact housing in response to a bias force provided by a coil spring extending between said annular member and said collar.

21. A cylindrical contact for a fiber optic connector, comprising:
   a ferrule having a parallelepiped shape, said ferrule having positioned therein the end of at least one optical fiber;
   a contact housing including two contact housing members arranged to capture therebetween said ferrule and a portion of a fiber optic cable including said fiber and extending from said ferrule, said contact housing having a crimp ferrule portion and a generally cylindrical shape adapted to replace a contact of a cylindrically shaped electrical connector; and
   a fixed collar and an annular member arranged to slide on said contact housing in response to a bias force provided by a coil spring extending between said annular member and said collar.

* * * * *